US005449746A

United States Patent [19]

Teshima

[11] Patent Number: 5,449,746

[45] Date of Patent: Sep. 12, 1995

[54] PROCESS FOR PURIFICATION OF STYRENIC POLYMER

[75] Inventor: Hideo Teshima, Ichihara, Japan

[73] Assignee: Idemitsu Kosan Co., Ltd., Tokyo, Japan

[21] Appl. No.: 376,670

[22] Filed: Jan. 23, 1995

Related U.S. Application Data

[63] Continuation of Ser. No. 46,805, Apr. 16, 1993, abandoned.

[30] Foreign Application Priority Data

Apr. 17, 1992 [JP] Japan .............................. 4-097573

[51] Int. Cl.$^6$ .............................. C08F 6/28

[52] U.S. Cl. .............................. 528/495; 528/497; 528/498

[58] Field of Search .............................. 528/495, 497, 498; 526/347.2

[56] References Cited

U.S. PATENT DOCUMENTS 2,216,094 9/1940 Britton et al. .............................. 528/497
2,915,514 12/1959 Denkowski .............................. 260/94.9
3,423,384 1/1969 Hagemeyer, Jr. et al. .............................. 260/93.7
3,910,865 10/1975 Osborn et al. .............................. 528/489
4,581,431 4/1986 Yamazaki et al. .............................. 528/499
5,321,122 6/1994 Kuramoto et al. .............................. 528/497

FOREIGN PATENT DOCUMENTS 0497207 8/1992 European Pat. Off. .
359012 3/1991 Japan .

OTHER PUBLICATIONS

Translation of Idemitsu, Japanese Application 3-59012, Mar. 14, 1991.

*Primary Examiner*—Joseph L. Schofer
*Assistant Examiner*—Tom Weber
*Attorney, Agent, or Firm*—Oblon, Spivak, McClelland, Maier & Neustadt

[57] ABSTRACT

There is disclosed a process for purifying a styrene polymer which comprises treating a highly syntiotactic styrene polymer which is produced by using a catalyst composition of (A) an aluminoxane or a specific coordination complex compound and (B) a transition metal compound with a swelling agent (e.g. ethylbenzene) and a deactivating agent (e.g. methanol, ethanol). The process is capable of efficiently purifying the styrene polymer produced by polymerizing a styrene monomer at a high concentration with a high conversion efficiency. Accordingly, the process greatly improves the industrial productivity of highly pure styrene polymer.

9 Claims, No Drawings

PROCESS FOR PURIFICATION OF STYRENIC POLYMER

This application is a continuation of application Ser. No. 08/046,805, filed on Apr. 16, 1993, now abandoned.

BACKGROUND OF THE INVENTION

1. Field of the Invention

The present invention relates to a process for the purification of a styrenic polymer. More particularly, it pertains to a process for efficiently purifying a styrenic polymer having a high degree of syndiotactic configuration in its stereochemical structure of polymer chain to a high level of purity.

2. Description of the Related Arts

Heretofore, styrenic polymers produced by the radical polymerization or the like have had an atactic configuration in stereostructure, have been molded to a variety of shapes by various molding methods such as injection molding, extrusion molding, blow molding, vacuum molding and cast molding and have been used for electrical appliances, office machines, household goods, packaging containers, toys, furnitures, synthetic papers and other industrial materials.

Because of their atactic configuration in stereochemical structure, however, such styrenic polymers have suffered the disadvantage of inferior heat and chemical resistances.

The group of the present inventors has previously succeeded in developing styrenic polymers each having a high degree of syndiotacticity and further, has proved that styrenic polymers having syndiotactic configuration are obtained by the use of a catalyst comprising a titanium compound and a contact product (alkylaluminoxane) of an organoaluminum compound with a condensing agent (refer to Japanese Patent Application Laid-Open No. 187708/1987).

The above-mentioned styrenic polymers are produced by means of slurry polymerization, bulk polymerization or the like and preferably in a high concentration of styrene from the viewpoint of the catalyst activity and polymer productivity. In addition, it has been desired to remove the residual catalyst components in the obtained polymer by means of deashing (removal of residual catalyst).

However, the problem still unsolved in deashing was that although the polymer product polymerized at a low conversion efficiency or a low concentration of styrene was easy to deash, the polymer with a high conversion efficiency, for example 60% or higher becomes difficult to deash and clean with increase in the conversion efficiency.

As a means for facilitating the deashing, there is available a method in which a deashing agent (exemplified by a strong acid and strong base) is employed at the glass transition temperature (Tg) or lower of the polymer (Japanese Patent Application Laid-Open No. 59012/1991) or at the Tg or higher thereof (Japanese Patent Application Laid-Open No. 25133/1991). Specifically the above-mentioned method comprises the steps of sufficiently swelling the polymer by the use of a swelling agent in the presence of a deashing agent, adding a deactivating agent simultaneously with a swelling agent to the polymer to decompose the catalytic components; and then thoroughly cleaning the polymer with a cleaning solvent or the like.

However, the use of an acid as the deashing agent causes the problems such as coloration of polymer and corrosion of a molding machine at the time of molding, while the use of a base brings about the problems such as corrosion of a molding machine at the time of molding and decomposition of other resins at the time of molding. As a means for solving the aforesaid problem, mention may be made of a method in which the polymer is cleaned with a large amount of a solvent. The method, however, leads to intricate, troublesome process and unreasonably large equipment for deashing and cleaning, thus causing expensive installation cost.

Under such circumstances, intensive research and investigation were made by the present inventors in order to overcome the above-mentioned problem involved in the prior art and to develop a process wherein a styrenic polymer with a high conversion efficiency can be efficiently purified to a high level of purity.

As the result, it has been found that the aforestated problem can be solved by treating the styrenic polymer to be purified with a swelling agent and a deactivating agent. The present invention has been accomplished on the basis of the foregoing finding and information.

SUMMARY OF THE INVENTION

It is an object of the present invention to provide a process for efficiently purifying a styrenic polymer with a high degree of syndiotacticity to a high level of purity.

It is another object of the present invention to improve the productivity of a styrenic polymer with a high degree of syndiotacticity with enhanced conversion efficiency and concentration of styrenic monomer.

Other objects of the present invention will in part be obvious and will in part appear hereinafter.

DESCRIPTION OF PREFERRED EMBODIMENTS

The process for the purification of a styrenic polymer according to the present invention comprises treating a styrenic polymer having a high degree of syndiotactic configuration which is produced by the use of a catalyst comprising (A) an aluminoxane or a coordination complex compound comprising a cation and an anion in which a plurality of radicals are bonded to a metal and (B) a transition metal compound with a swelling agent and a deactivating agent.

The component (A) of the catalyst to be used in the present invention is, as mentioned above, an aluminoxane or a coordination complex compound comprising a cation and an anion in which a plurality of radicals are bonded to a metal. Here, the aluminoxane is a compound obtained by bringing one of various organoaluminum compounds into contact with a condensing agent. As the organoaluminum compound used as a starting material, an organoaluminum compound represented by the general formula:

$$AlR^1_3 \quad (I)$$

wherein $R^1$ is an alkyl group having 1 to 8 carbon atoms, more specifically, trimethylaluminum, triethylaluminum and triisobutylaluminum can be mentioned, and trimethylaluminum is most desirable.

On the other hand, a typical example of the condensing agent for said organoaluminum compound is water. In addition, any compounds capable of undergoing a condensation reaction with organoaluminum compounds including alkylaluminum can be used.

As the aluminoxane of Component (A) may include chain alkylaluminoxane represented by the general formula:

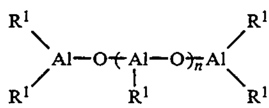
(II)

wherein n indicates polymerization degree, and a number of 2 to 50; and $R^1$ represents an alkyl group having 1 to 8 carbon atoms,
and cycloalkylaluminoxane having the repeating unit represented by the general formula:

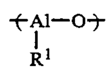
(III)

and the like. Of these alkylaluminoxanes, that wherein $R^1$ is a methyl group, i.e. methylaluminoxane is particularly desirable.

Generally, the reaction product of alkylaluminum compound such as trialkylaluminum and water includes the above-mentioned chain alkylaluminoxane and cycloalkylaluminoxane, unreacted trialkylaluminum, a mixture of various condensation products, and further complicatedly associated molecules thereof, which becomes various products according to the contacting conditions of the alkylaluminum compound and water.

The reaction of the alkylaluminum compound and water is not specifically limited, but may be performed according to known methods; for example, (1) a method in which an alkylaluminum compound is dissolved in an organic solvent and then brought into contact with water; (2) a method in which an alkylaluminum compound is added at the start of polymerization, and then water is added; and (3) a method in which an alkylaluminium compound is reacted with water of crystallization as contained in metal salts and the like, or water absorbed in inorganic or organic compounds. The above water may contain ammonia, amine such as ethylamine, sulfur compound such as hydrogen sulfide, phosphorus compound such as phosphite and the like in the proportion of less than 20%, approximately.

The aluminoxane, especially alkylaluminoxane to be used in the present invention is prepared by a method in which, when a hydrated compound is used, the resultant solid residue is filtered after the above contact reaction and the filtrate is heat treated under atmospheric or reduced pressure at a temperature of 30° to 200° C., preferably 40° to 150° C. for from 20 minutes to 8 hours, preferably from 30 minutes to 5 hours while removing the solvent. The temperature for the heat treatment, may be determined optionally depending on various conditions, but usually the above range may be used. If the temperature is less than 30° C., effects cannot be obtained, and if it exceeds 200° C., aluminoxane itself is undesirably pyrolyzed. Depending on the conditions of the heat treatment, the reaction product can be obtained as a colorless solid or solution. The product thus obtained can be used as a catalyst solution, if necessary, by dissolving or diluting with a hydrocarbon solvent.

Suitable examples of the alkylaluminoxane are those in which the area of the high magnetic field component in the methyl proton signal region due to the aluminum-methyl group ($Al-CH_3$) bond as observed by the proton nuclear magenetic resonance method is not more than 50% of the total signal area. That is, in a proton nuclear magnetic resonance ($^1$HNMR) spectral analysis of a solution of the alkylaluminoxane in toluene at room temperature, the methyl proton signal due to Al-$CH_3$ is observed in the region of 1.0 to −0.5 ppm (tetramethylsilane (TMS) standard). Since the proton signal of TMS (0 ppm) is in the 1.0 to −0.5 ppm region of the methyl proton signal due to $Al-CH_3$, the methyl proton signal due to $Al-CH_3$ is measured with 2.35 ppm methyl proton signal of toluene in TMS standard. The methyl proton signal due to $Al-CH_3$ is divided into two components: the high magnetic field component in the −0.1 to −0.5 ppm region and the other magnetic field component in the 1.0 to −0.1 ppm region. In alkylaluminoxane preferably used as component (A) of the catalyst in the present invention, the area of the high magnetic field component is not more than 50%, preferably 45 to 5% of the total signal area in the 1.0 to −0.5 ppm region.

As the component (A) which constitutes the primary ingredient of the catalyst in the process according to the present invention, a coordination complex compound comprising a cation and an anion in which a plurality of radicals are bonded to a metal can be used in place of the aforestated aluminoxane. A variety of such coordination complex compounds are available, and those represented by the following general formulae (IV) or (V) are preferably employed:

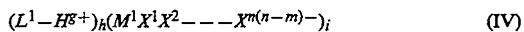

$$(L^1-H^{g+})_h(M^1X^1X^2---X^{n(n-m)-})_i \quad \text{(IV)}$$

or

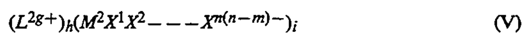

$$(L^{2g+})_h(M^2X^1X^2---X^{n(n-m)-})_i \quad \text{(V)}$$

wherein $L^2$ is $M^3$, $T^1T^2M^4$ or $T^3{}_3C$ as hereinafter described; $L_1$ is a Lewis base; $M^1$ and $M^2$ are each a metal selected from Groups 5 to 15 of the Periodic Table; $M^3$ is a metal selected from Groups 8 to 12 of the Periodic Table; $M^4$ is a metal selected from Groups 8 to 10 of the Periodic Table; $X^1$ to $X^n$ are each a hydrogen atom, dialkylamino group, alkoxy group, aryloxy group, alkyl group having 1 to 20 carbon atoms, aryl group having 6 to 20 carbon atoms, alkylaryl group having 7 to 20 carbon atoms, arylalkyl group having 7 to 20 carbon atoms, substituted alkyl group, organometalloid group or halogen atom; $T^1$ and $T^2$ are each a cyclopentadienyl group, substituted cyclopentadienyl group, indenyl group or fluorenyl group; $T^3$ is an alkyl group; m is the valency of each of $M^1$ and $M^2$ indicating an integer of 1 to 7; n is an integer of 2 to 8; g is the ion valency of each of $L^1-H$ and $[L^2]$, indicating an integer of 1 to 7; h is an integer of 1 or more; and $i=h \times g/(n-m)$.

Specific examples of $M^1$ and $M^2$ include B, Al, Si, P, As, Sb, etc.; those of $M^3$ include Ag, Cu, etc.; and those of $M^4$ include Fe, Co, Ni, etc. Specific examples of $X^1$ to $X^n$ include dialkylamino group such as dimethylamino and diethylamino; alkoxyl group such as methoxy, ethoxy and n-butoxy; aryloxy group such as phenoxy, 2,6-dimethylphenoxy and naphthyloxy; alkyl group having 1 to 20 carbon atoms such as methyl, ethyl, n-propyl, iso-propyl, n-butyl, n-octyl and 2-ethylhexyl; aryl group having 6 to 20 carbon atoms, alkylaryl group or arylalkyl group such as phenyl, p-tolyl, benzyl, pentafluorophenyl, 3,5-di(trifluoromethyl)phenyl, 4-tert-butylphenyl, 2,6-dimethylphenyl, 3,5-dimethylphenyl, 2,4-dimethylphenyl and 1,2-dimethylphenyl; halogen such as F, Cl, Br and I; and organometalloid group such as pentamethylantimony group, trimethylsilyl group, trimethylgermyl group, diphenylarsine group, dicyclohexylantimony group and diphenylboron group. Specific examples of substituted cyclopentadienyl of $R^5$ and $R^6$ include methylcyclopentadienyl, butylcyclopentadienyl and pentamethylcyclopentadienyl.

Among the compounds represented by the above-mentioned general formula (IV) or (V) specific examples of preferably usable compounds include, as the compound of general formula (IV), triethylammonium tetraphenylborate, tri(n-butyl)ammonium tetraphenylborate, trimethylammonium tetraphenylborate, triethylammonium tetra(pentafluorophenyl)borate, tri(n-butyl)ammonium tetra(pentafluorophenyl)borate, triethylammonium hexafluoroarsenate, etc., and as the compound of general formula (V), pyridinium tetra(pentafluorophenyl)borate, pyrrolium tetra(pentafluorophenyl)borate, N,N-dimethylanilinium tetra(pentafluorophenyl)borate, methyldiphenylammonium tetra(pentafluorophenyl)borate, ferrocenium tetraphenylborate, dimethylferrocenium tetra(pentafluorophenyl)borate, ferrocenium tetra(pentafluorophenyl)borate, decamethylferrocenium tetra(pentafluorophenyl)borate, acetylferrocenium tetra(pentafluorophenyl)borate, formylferrocenium tetra(pentafluorophenyl)borate, cyanoferrocenium tetra(pentafluorophenyl)borate, silver tetraphenylborate, silver tetra(pentafluorophenyl)borate, trityltetraphenylborate, trityltetra(pentafluorophenyl)borate, silver hexafluoroarsenate, silver hexafluoroantimonate, silver tetrafluoroborate, triphenylcarbenium tetra(pentafluorophenyl)borate, etc.

As the transition metal compound of component (B) of the catalyst used in the present invention, mention may be made of the compound of the metals in Groups 3 to 6 of the Periodic Table and lanthanum series, of which are preferable compounds of the metals in Group 4 (titanium zirconium hafnium, vanadium, etc.). Various titanium compound are available and a preferred example is at least one compound selected from the group consisting of titanium compounds and titanium chelate compounds represented by the general formula:

$$TiR^2{}_aT^3{}_bR^4{}_cR^5{}_{4-(a+b+c)} \quad \text{(VI)}$$

or $$TiR^2{}_dR^3{}_eR^4{}_{3-(d+e)} \quad \text{(VII)}$$

wherein $R^2$, $R^3$, $R^4$ and $R^5$ are each a hydrogen atom, an alkyl group having 1 to 20 carbon atoms, an alkoxy group having 1 to 20 carbon atoms, an aryl group having 6 to 20 carbon atoms, an alkylaryl group having 7 to 20 carbon atoms, an arylalkyl group having 7 to 20 carbon atoms, an acyloxy group having 1 to 20 carbon atoms, a cyclopentadienyl group, a substituted cyclopentadienyl group, an indenyl group or a halogen atom; a, b and c are each an integer of 0 to 4; and d and e are each an integer of 0 to 3.

$R^2$, $R^3$, $R^4$ and $R^5$ in the formulae (VI) and (VII) each represent a hydrogen atom, an alkyl group having 1 to 20 carbon atoms (specifically, methyl group, ethyl group, propyl group, butyl group, amyl group, isoamyl group, isobutyl group octyl group and 2-ethylhexyl group), an alkoxy group, having 1 to 20 carbon atoms (specifically, methoxy group, ethoxy group, propoxy group, butoxy group, amyloxy group, hexyloxy group, and 2-ethylhexyloxy group), an aryl group having 6 to 20 carbon atoms, an alkylaryl group, an arylalkyl group (specifically, phenyl group, tolyl group, xylyl group and benzyl group), an acyloxy group having 1 to 20 carbon atoms (specifically, heptadecylcarbonyloxy group), a cyclopentadienyl group, a substituted cyclopentadienyl group (specifically, methylcyclopentadienyl group, 1,2-dimethylcyclopentadienyl group and pentamethylcyclopentadienyl group), an indenyl group or a halogen atom (specifically, chlorine, bromine, iodine and fluorine). These $R^2$, $R^3$, $R^4$ and $R^5$ may be the same as or different from each other. Furthermore, a, b and c each are an integer of 0 to 4, and d and e each are an integer of 0 to 3.

More preferred titanium compounds include a titanium compound represented by the formula:

$$TiRXYZ \quad \text{(VIII)}$$

wherein R represents a cyclopentadienyl group, a substituted cyclopentadienyl group or an indenyl group; X, Y and Z are independently a hydrogen atom, an alkyl group having 1 to 12 carbon atoms, an alkoxy group having 1 to 12 carbon atoms, an aryl group having 6 to 20 carbon atoms, an aryloxy group having 6 to 20 carbon atoms, an arylalkyl group having 7 to 20 carbon atoms or a halogen atom.

The substituted cyclopentadienyl group represented by R in the above formula is, for example, a cyclopentadienyl group substituted by at least one of an alkyl group having 1 to 6 carbon atoms, more specifically, methylcyclopentadienyl group, 1,2-dimethylcyclopentadienyl group and pentamethylcyclopentadienyl group. In addition, X, Y and Z are each independently a hydrogen atom, an alkyl group having 1 to 12 carbon atoms (specifically, methyl group, ethyl group, propyl group, n-butyl group, isobutyl group, amyl group, isoamyl group, octyl group and 2-ethylhexyl group), an alkoxy group having 1 to 12 carbon atoms (specifically, methoxy group ethoxy group, propoxy group, butoxy group, amyloxy group, hexyloxy group, octyloxy group and 2-ethylhexyl group), an aryl group having 6 to 20 carbon atoms (specifically, phenyl group and naphthyl group), an aryloxy group having 6 to 20 carbon atoms (specifically, phenoxy group), an arylalkyl group having 7 to 20 carbon atoms (specifically, benzyl group) or a halogen atom (specifically, chlorine, bromine, iodine and fluorine).

Specific examples of the titanium compound represented by the formula (VIII) include cyclopentadienyltrimethyltitanium, cyclopentadienyltriethyltitanium, cyclopentadienyltripropyltitanium, cyclopentadienyltributyltitanium, methylcyclopentadienyltrimethyltitanium, 1,2-dimethylcyclopentadienyltrimethyltitanium, pentamethylcyclopentadienyltrimethyltitanium, pentamethylcyclopentadienyltriethyltitanium, pentamethylcyclopentadienyltripropyltitanium, pentamethylcyclopentadienyltributyltitanium, cyclopentadienylmethyltitanium dichloride, cyclopentadienylethyltitanium dichloride, pentamethylcyclopentadienylmethyltitanium dichloride, pentamethylcyclopentadienylethyltitanium dichloride, cyclopentadienyldimethyltitanium monochloride, cyclopentadienyldiethyltitanium monochloride, cyclopentadienyltitanium trimethoxide, cyclopentadienyltitanium triethoxide, cyclopentadienyltitanium tripropoxide, cyclopentadienyltitanium triphenoxide, pentamethylcyclopentadienyltitanium trimethoxide, pentamethylcyclopentadienyltitanium triethoxide, pentamethylcyclopentadienyltitanium tripropoxide, pentamethylcyclopentadienyltitanium tributoxide, pentamethylcyclopentadienyltitanium triphenoxide, cyclopentadienyltitanium trichloride, pentamethylcyclopentadienyltitanium trichloride, cyclopentadienylmethoxytitanium dichloride, cyclopentadienyldimethoxytitanium monochloride, pentamethylcyclopentadienylmethoxytitnaium dichloride, cyclopentadienyltribenzyltitanium, pentamethylcyclopentadienylmethyldiethoxytitanium, indenyltitanium trichloride, indenyltitanium trimethoxide, indenyltitanium triethoxide, indenyltrimethyltitanium and indenyltribenzyltitanium.

Of these titanium compounds, a compound not containing halogen atom is preferred and a titanium compound having one $\pi$-electron type ligand as mentioned above is particularly preferred.

Furthermore, a condensed titanium compound represented by the following formula can be used as the titanium compound.

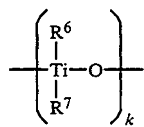

(IX)

wherein $R^6$ and $R^7$ each represent a halogen atom, an alkoxy group having 1 to 20 carbon atoms or an acyloxy group having 1 to 20 carbon atoms; and k is an integer of 2 to 20.

Furthermore, the above titanium compounds can be used in the form of a complex formed with an ester or an ether.

The trivalent titanium compound represented by the formula (VII) typically includes a trihalogenated titanium such as titanium trichloride; and a cyclopentadienyltitanium compound such as cyclopentadienyltitanium dichloride, and also those obtained by reducing a tetravalent titanium compound. These trivalent titanium compounds can be used in the form of a complex formed with an ester or an ether.

In addition, the zirconium compound used as the transition metal compound includes tetrabenzylzirconium, zirconium tetraethoxide, zirconium tetrabutoxide, bisindenylzirconium dichloride, triisopropoxyzirconium monochloride, zirconium benzyl dichloride and tributoxyzirconium monochloride, hafnium compound includes tetrabenzyl hafnium, tetraethoxide hafnium and tetrabutoxide hafnium, and vanadium compound includes vanadyl bisacetylacetonato, vanadyl triacetylacetonato, vanadyl triethoxide and vanadyl tripropoxide. Of these transition metal compounds, the titnaium compounds are particularly desirable.

As the transition metal compound which constitutes the component (B) of the catalyst, there may be used a transition metal compound with two ligands having conjugated $\pi$ electrons, for example, at least one compound selected from the group consisting of the transition metal compound represented by the general formula:

$$M^5R^8R^9R^{10}R^{11} \quad (X)$$

wherein $M^5$ is titanium, zirconium or hafnium; $R^8$ and $R^9$ are each a cyclopentadienyl group, substituted cyclopentadienyl group, indenyl group or fluorenyl group; and $R^{10}$ and $R^{11}$ are each a hydrogen atom, halogen, hydrocarbon radical having 1 to 20 carbon atoms, alkoxy group having 1 to 20 carbon atoms, amino group or thioalkoxy group having 1 to 20 carbon atoms, but $R^8$ and $R^9$ may be each cross-linked by a hydrocarbon radical having 1 to 5 carbon atoms, alkylsilyl group having 1 to 20 carbon atoms and 1 to 5 silicon atoms or germanium-containing hydrocarbon group having 1 to 20 carbon atoms and 1 to 5 germanium atoms.

In more detail, each of $R^8$ and $R^9$ designates a cyclopentadienyl group, substituted cyclopentadienyl group, more specifically, methylcyclopentadienyl group; 1,3-dimethylcyclopentadienyl group; 1,2,4-trimethylcyclopentadienyl group; 1,2,3,4-tetramethylcyclopentadienyl group; pentamethylcyclopentadienyl group; trimethylsilylcyclopentadienyl group; 1,3-di(trimethylsilyl)cyclopentadienyl group; 1,2,4-tri(trimethylsilyl)cyclopentadienyl group; tert-butylcyclopentadienyl group; 1,3-di(tert-butyl)cyclopentadienyl group; 1,2,4-tri(tert-butyl)cyclopentadienyl group or the like, indenyl group, substituted indenyl group, more specifically, methylindenyl group; dimethylindenyl group; trimethylindenyl group or the like, fluorenyl group, or substituted fluorenyl group such as methylfluorenyl group, and may be the same or different and cross-linked by an alkylidene group having 1 to 5 carbon atoms, more specifically, methylidyne group; ethylidene group; propylidene group; dimethylcarbyl group or the like, or an alkylsilyl group having 1 to 20 carbon atoms and 1 to 5 silicon atoms, more specifically, dimethylsilyl group; diethylsilyl group; dibenzylsilyl group or the like. Each of $R^{10}$ and $R^{11}$ independently indicates, as described above but more specifically, a hydrogen atom; an alkyl group having 1 to 20 carbon atoms such as methyl group, ethyl group propyl group, n-butyl group, isobutyl group, amyl group, isoamyl group, octyl group or 2-ethylhexyl group; an aryl group having 6 to 20 carbon atoms such as phenyl group or naphthyl group; an arylalkyl group having 7 to 20 carbon atoms such as benzyl group; an alkoxyl group having 1 to 20 carbon atoms such as methoxyl group, ethoxyl group, propoxyl group, butoxyl group, amyloxy group, hexyloxy group octyloxy group or 2-ethylhexyloxy group; an aryloxy group having 6 to 20 carbon atoms such as phenoxy group; an amino group; or a thioalkoxyl group having 1 to 20 carbon atoms.

Specific examples of the transition-metal compounds represented by the general formula (X) include bis(cyclopentadienyl)dimethyltitanium; bis(cyclopentadienyl) diethyltitanium; bis(cyclopentadienyl)dipropyltitanium; bis(cyclopentadienyl)dibutyltitanium; bis(methylcyclopentadienyl)dimethylyiysnium; bis(tertbutylcyclopentadienyl)dimethyltitanium; bis(1,3dimethylcyclopentadienyl)dimethyltitanium; bis(1,3-di-tert-butylcyclopentadienyl)dimethyltitanium; bis(1,2,4-trimethylcyclopentadienyl)dimethyltitanium; bis(1,2,3,4-tetramethylcyclopentadienyl)dimethyltitanium; bis(trimethylsilylcyclopentadienyl)dimethyltitanium; bis(1,3-di(trimethylsilyl)cyclopentadienyl)dimethyltitanium; bis(1,2,4-tri(trimethylsilyl)cyclopentadienyl)dimethyltitanium; bis(indenyl)dimethyltitanium; bis(fluorenyl)dimethyltitanium; methylenebis(cyclopentadienyl)dimethyltitanium; ethylidenebis(cyclopentadienyl)dimethyltitanium; methylenebis(2,3,4,5-tetramethylcyclopentadienyl) dimethyltitanium; ethylidenebis(2,3,4,5-tetramethylcyclopentadienyl)dimethyltitanium; dimethylsilylbis(2,3,4,5-tetramethylcyclopentadienyl)dimethyltitanium; methylenebisindenyldimethyltitanium; ethylidenebisindenyldimethyltitanium; dimethylsilylbisindenyldimethyltitanium; methylenebisfluorenyldimethyltitanium; ethylidenbisfluorenyldimethyltitanium; dimethylsilylbisfluorenyldimethyltitanium; methylene(tert-butylcyclopentadienyl)(cyclopentadienyl)dimethyltitanium; methylene(cyclopentadienyl)(indenyl)dimethyltitanium; ethylidene(cyclopentadienyl)(indenyl)dimethyltitanium; dimethylsilyl(cyclopentadienyl)(indenyl)dimethyltitanium; methylene(cyclopentadienyl)(fluorenyl)dimethyltitanium; ethylidene(cyclopentadienyl)(fluorenyl)dimethyltitanium; dimethylsilyl(cyclopentadienyl)(fluorenyl)dimethyltitanium; methylene(indenyl)(fluorenyl)dimethyltitanium; ethylidene(indenyl)(fluorenyl)dimethyltitanium; dimethylsilyl(indenyl)(fluorenyl)dimethyltitanium; bis(cyclopentadienyl)dibenzyltitanium; bis(-tertbutylcyclopentadienyl)dibenzyltitanium; bis(methylcyclopentadienyl)dibenzyltitanium; bis(1,3-dimethylcyclopentadienyl)dibenzyltitanium; bis(1,2,4-trimethylcyclopentadienyl)dibenzyltitanium; bis(1,2,3,4-tetramethylcyclopentadienyl)dibenzyltitanium; bis(pentamethylcyclopentadienyl)dibenzyltitanium; bis(trimethylsilylcyclopentadienyl)dibenzyltitanium; bis 1,3-di-(trimethylsilyl)cyclopentadienyl dibenzyltitanium; bis 1,2,4-tri(trimethylsilyl)cyclopentadienyl dibenzyltitanium; bis(indenyl)dibenzyltitanium; bis(fluorenyl)-dibenzyltitanium; methylenebis(cyclopentadienyl)-dibenzyltitanium; ethylidenebis(cyclopentadienyl)-dibenzyltitanium; methylenebis(2,3,4,5-tetramethylcyclopentadienyl)dibenzyltitanium; ethylidenebis(2,3,4,5-tetramethylcyclopentadienyl) dibenzyltitanium; dimethylsilylbis(2,3,4,5-tetramethylcyclopentadienyl)dibenzyltitanium; methylenebis(indenyl)dibenzyltitanium; ethylidenebis(indenyl)dibenzyltitanium; dimethylsilylbis(indenyl)dibenzyltitanium; methylenebis(fluorenyl)-dibenzyltitanium; ethylidenebis(fluorenyl)dibenzyltitanium; dimethylsilylbis(fluorenyl)dibenzyltitanium; methylene(cyclopentadienyl)(indenyl)benzyltitanium; ethylidene(cyclopentadienyl)(indenyl)benzyltitanium; dimethylsilyl(cyclopentadienyl)(indenyl)dibenzyltitanium; methylene(cyclopentadienyl)(fluorenyl)-dibenzyltitanium; ethylidene(cyclopentadienyl)(-fluorenyl)dibenzyltitanium; dimethylsilyl(cyclopentadienyl)(fluorenyl)dibenzyltitanium; methylene(indenyl)(fluorenyl)dibenzyltitanium; ethylidene(indenyl)(fluorenyl)dibenzyltitanium; dimethylsilyl(indenyl)(fluorenyl)dibenzyltitanium; biscyclopentadienyltitanium dimethoxide; biscyclopentadienyltitanium diethoxide; biscyclopentadienyltitanium dipropoxide; biscyclopentadienyltitanium dibutoxide; biscyclopentadienyltitanium dipheoxide; bis(methylcyclopentadienyl)titanium dimethoxide; bis(1,3-dimethylcyclopentadienyl)titanium dimethoxide; bis(1,2,4-trimethylcyclopentadienyl)titanium dimethoxide; bis(1,2,3,4-tetramethylcyclopentadienyl)titanium dimethoxide; bispentamethylcyclopentadienyltitanium dimethoxide; bis(trimethylsilylcyclopentadienyl)titanium dimethoxide; bis 1,3-di-(trimethylsilyl)cyclopentadienyl titanium dimethoxide; bis 1,2,4-tri(trimethylsilyl)cyclopentadienyl titanium dimethoxide; bisindenyltitanium dimethoxide; bisfluorenyltitanium dimethoxide; methylenebiscyclopentadienyltitanium dimethoxide; ethylidenebiscyclopentadienyltitanium dimethoxide; methylenebis(2,3,4,5-tetramethylcyclopentadienyl)-titanium dimethoxide; ethylidenebis(2,3,4,5tetramethylcyclopentadienyl)titanium dimethoxide; dimethylsilylbis(2,3,4,5-tetramethylcyclopentadienyl)titanium dimethoxide; methylenebisindenyltitanium dimethoxide; methylenebis(methylindenyl)titanium dimethoxide; ethylidenebisindenyltitanium dimethoxide; dimethylsilylbisindenyltitanium dimethoxide; methylenebisfluorenyltitanium dimethoxide; methylenebis(methylfluorenyl)titanium dimethoxide; ethylidenebisfluorenyltitanium dimethoxide; dimethylsilylbisfluorenyltitanium dimethoxide; methylene(cyclopentadienyl)(indenyl)-titanium dimethoxide; ethylidene(cyclopentadienyl)(indenyl)titanium dimethoxide; dimethylsilyl(cyclopentadienyl)(indenyl)titanium dimethoxide; methylene(cyclopentadienyl)(fluorenyl)titanium dimethoxide; ethylidene(cyclopentadienyl)(fluorenyl)titanium dimethoxide; dimethylsilyl(cyclopentadienyl)(fluorenyl)-titanium dimethoxide; methylene(indenyl)(fluorenyl)-titanium dimethoxide; ethylidene(indenyl)(fluorenyl)-titanium dimethoxide; dimethylsilyl(indenyl)(-fluorenyl)titanium dimethoxide, etc.

Examples of the transition metal compounds represented by the formula (X) wherein $M^5$ is zirconium include ethylidenebiscyclopentadienylzirconium dimethoxide, dimethylsilylbiscyclopentadienylzirconium dimethoxide, etc. Examples of the hafnium compounds according to the general formula ( X ) include ethylidenebiscyclopentadienylhafnium dimethoxide, dimethylsilylbiscyclopentadienylhafnium dimethoxide, etc. Particularly desirable transition-metal compounds among them are titanium compounds.

In addition to the combinations of the above, the compound may be a bidentate coordination complex such as 2,2'-thiobis(4-methyl-6-tert-butylphenyl)-titanium diisopropoxide and 2,2'-thiobis(4-methyl-6-tertbutylphenyl)titanium dimethoxide.

In the process of the present invention, if desired, in addition to the above components (A) and (B), another catalytic components such as organoaluminum can be added.

The organoaluminum includes and organoaluminum compound represented by the formula:

$$R^{12}{}_jAl(OR^{13})_xH_yX'_z \qquad (XI)$$

wherein $R^{12}$ and $R^{13}$ each independently represent an alkyl group having 1 to 8 carbon atoms, preferably 1 to 4 carbon atoms; X' represents a halogen; j, x, y and z are $0<j\leqq 3$, $0\leqq x<3$, $0\leqq y<3$ and $0\leqq z<3$, respectively, and $j+x+y+z=3$. The activity of the catalyst is further improved by adding the above compound.

The organoaluminum compound represented by the above formula (XI) can be exemplified as shown below. Those corresponding to $y=z=0$ are represented by the formula: $R^{12}{}_jAl(OR^{13})_{3-j}$, wherein $R^{12}$ and $R^{13}$ are the same as those mentioned above and j is preferably a number of $1.5\leqq j\leqq 3$. Those corresponding to $x=y=0$ are represented by the formula: $R^{12}{}_jAlX'_{3-j}$, wherein $R^{12}$ and X' are the same as those mentioned above and j is preferably a number of $0<j<3$. Those corresponding to $x=z=0$ are represented by the formula: $R^{12}{}_jAlH_{3-j}$, wherein $R^{12}$ is the same as mentioned above and j is preferably a number of $2\leqq j<3$. Those corresponding to $y=0$ are represented by the formula: $R^{12}{}_jAl(OR^{13})X'_z$, wherein $R^{12}$, $R^{13}$ and X' are the same as those mentioned above and $0<j\leqq 3$, $0\leqq x<3$, $0\leqq z<3$ and $j+x+z=3$.

In the organic aluminum compound represented by the formula (XI), the compound wherein $y=z=0$ and $j=3$ is selected from, for example, trialkylaluminum such as trimethylaluminum, triethylaluminum and tributylaluminum, or combination thereof. In the case of $y=z=0$ and $1.51\leqq j<3$, included are dialkylaluminum alkoxide such as diethylaluminum ethoxide and dibutylaluminum butoxide; alkylaluminum sesquialkoxide such as ethylaluminum sesquiethoxide and butylaluminum sesquibutoxide; as well as partially alkoxylated alkylaluminum having an average composition represented by $R^{12}_{2.5}Al(OR^{13})_{0.5}$. Examples of the compound corresponding to the case where x=y=0 include a partially halogenated alkylaluminum including dialkylaluminum halogenide (j=2) such as diethylaluminum monochloride, dibutylaluminum monochloride and diethylaluminum monobromide; alkylaluminum sesquihalogenide (j=1.5) such as ethylaluminum sesquichloride, butylaluminum sesquichloride and ethylaluminum sesquibromide; and alkylaluminum dihalogenide (j=1) such as ethylaluminum dichloride, propylaluminum dichloride and butylaluminum dibromide. Examples of the compound corresponding to the case in which x=z=0 includes a partially hydrogenated alkylaluminum including dialkylaluminum hydride (j=2) such as diethylaluminum hydride and dibutylaluminum hydride; alkylaluminum dihydride (x=1) such as ethylaluminum dihydride and propylaluminum dihydride. Examples of the compound corresponding to the case in which y=0 include a partially alkoxylated or halogenated alkylaluminum such as ethylaluminumethoxy chloride, butylaluminumbutoxy chloride and ethylaluminumethoxy bromide (j=x=z=1). Of these, triisobutylaluminum and triisobutylaluminum hydride are particularly suitable.

The catalyst to be used in the present invention comprises Components (A) and (B) as the main components, and in addition, other catalytic components can be added if desired. The ratio of Components (A) and (B) in the catalyst varies depending on various conditions, and cannot be unequivocally defined, but usually it is, in terms of the molar ratio of the metal in Component (B) to the metal in Component (A), 1:1 to $1:10^6$, preferably 1:10 to $1:10^4$ for aluminoxane; 0.1:1 to 1:0.1 for the coordination complex compound in which a plurality of radicals are bonded to a metal; and the molar ratio of Component (B) to the organoaluminum is 1:0.1 to $1:10^3$ in the case where the organoaluminum compound represented by the general formula (XI) is added thereto.

In order to produce a styrenic polymer, styrenic monomer/s are polymerized or copolymerized in the presence of a catalyst comprising the above components (A) and (B) as primary components.

The styrenic monomer to be used in the present invention indicates styrene and/or styrene derivatives.

Specific examples of the styrene derivatives include alkylstyrenes such as p-methylstyrene, m-methylstyrene, o-methylstyrene, 2,4-dimethylstyrene, 2,5-dimethylstyrene, 3,4-dimethylstyrene, 3,5-dimethylstyrene, p-ethylstyrene, m-ethylstyrene and p-tertiary-butylstyrene; halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene and o-methyl-p-fluorostyrene; alkoxystyrenes such as p-methoxystyrene, m-methoxystyrene, o-methoxystyrene, p-ethoxystyrene, m-ethoxystyrene, and o-ethoxystyrene; carboxyesterstyrenes such as p-carboxymethylstyrene, m-carboxymethylstyrene, and o-carboxymethylstyrene; alkyl etherstyrenes such as p-vinylbenzylpropylether; or mixtures of two or more kinds of them.

The polymerization (or copolymerization) of styrenic monomer may be bulk polymerization, and may be carried out in a solvent of aliphatic hydrocarbon such as pentane, hexane, and heptane; alicyclic hydrocarbon such as cyclohexane; or aromatic hydrocarbon such as benzene, toluene and xylene. In view of productivity, it is preferred to polymerize styrenic monomer in a high concentration in the case of slurry polymerization.

In the present invention, polymerization of styrenic monomer is effected desirably with a styrenic monomer concentration of 50% by volume or higher and more desirably 70% by volume or higher.

Bulk polymerization is excellent in productivity and impregnancy.

Conditions for polymerization in the present invention are not limited particularly, but can be performed in the conventional manner; for example, at a temperature of 0° to 100° C., preferably 20° to 80° C.

The styrenic polymer thus obtained has a high degree of syndiotactic configuration.

Here, the styrenic polymer which has a high degree of the syndiotactic configuration means that its stereochemical structure is of high degree of syndiotactic configuration, i,e. the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}C$-NMR method) using carbon isotope. The tacticity as determined by the $^{13}C$-NMR method can be indicated in terms of proportions of structural units continuously connected to each other, i.e., a diad in which two structural units are connected to each other, a triad in which three structural units are connected to each other and a pentad in which five structural units are connected to each other. The styrenic polymers having such a high degree of sundiotactic configuration as mentioned in the present invention usually means polystyrene, poly(alkylstyrene), poly(-halogenated styrene), poly(alkoxystyrene), poly(vinyl benzoate), the mixture thereof, and copolymers containing the above polymers as main components, having such a syndiotacticity that the proportion of racemic diad is at least 75%, preferably at least 85%, or the proportion of racemic pentad is at least 30%, preferably at least 50%. The poly(alkylstyrene) includes poly(-methylstyrene), poly(ethylstyrene), poly(isopropylstyrene), poly(tert-butylstyrene). Poly(halogenated styrene) includes poly(chlorostyrene), poly(bromostyrene), and poly(fluorostyrene). Poly(alkoxystyrene) includes poly(methoxystyrene), and poly(ethoxystyrene).

The most desirable styrenic polymers are polystyrene, poly(p-methylstyrene), poly(m-methylstyrene), poly(p-tertbutylstyrene), poly(p-chlorostyrene), poly(m-chlorostyrene), poly(p-fluorostyrene), and the copolymer of styrene and p-methylstyrene.

In the process according to the present invention, the polymerization reaction is continued until the conversion to polymer reaches, for example, 60% and preferably 70% or higher. The conversion to polymer can be controlled by various polymerization conditions such as the catalyst to be used, polymerization temperature and polymerization time.

According to the present invention, in the case of purifying the styrenic polymer having a high degree of syndiotactic configuration thus produced, the residual catalyst components and the like in the produced styrenic polymer can be effectively removed by treating the polymer by the use of a swelling agent and a deactivating agent.

There are available various methods of purifying treatment, which are exemplified by a method wherein swelling and deactivation are carried out separately and a method wherein swelling is performed simultaneously with deactivation, of which is preferable the latter method. The former method complicates the treatment steps and besides, involves the possibility that after the swelling step, the once swollen polymer contracts in a cleaning solvent.

The swelling agent to be used herein has a solubility parameter (SP value) of desirably 7 to 10 $(cal/cm^3)^{\frac{1}{2}}$, more desirably 8 to 9.5 $(cal/cm^3)^{\frac{1}{2}}$. The swelling agent to be used is not specifically limited in the type and exemplified by an aromatic solvent such as benzene, toluene, ethylbenzene, xylene and styrene, of which are preferable toluene, xyelene and ethylbenzene; and an aliphatic solvent such as cyclohexane and methyl ethyl ketone, of which is preferable cyclohexane.

The amount of such a swelling agent to be added to the polymer may be selected in accordance with a variety of conditions and is usually adjusted so as to attain a degree of swelling of the styrenic polymer in the range of 5 to 55%, preferably 10 to 30%. The swelling treatment is usually carried out at a temperature of 30° to 200° C., desirable 50° to 150° C., more desirably 80° to 130° C. The above-mentioned degree of swelling ($V_c$) is calculated by the following formula $$V_c = 100(V - V_o)/V_o (\% \text{ by volume})$$

wherein $V_o$ is the apparent volume obtained by the steps of gently shaking or leaving polymer particles having a particle size of 0.7 to 1.7 mm in a solvent at 20° C. until an equilibrium state is attained, thereafter once floating the polymer particles and finally subjecting the particles to natural sedimentation; and V is the apparent volume obtained by the steps same as above except that polymer particles are treated at a prescribed temperature.

The deactivating agent has preferably an active hydrogen and exemplified by an alcohol having 1 to 6 carbon atoms, an amine and water, of which is preferable an alcohol having 1 to 6 carbon atoms. The amount of such deactivating agent to be added to the polymer is not specifically limited but, in short, may only be adjusted to an amount sufficient to deactivate the catalyst, usually to an amount not smaller than the amount of the catalyst in mole used for the polymerization.

In the above-mentioned purifying treatment, the aforestated swelling agent and deactivating agent are preferably added at the same time, as described hereinbefore, to the polymerization reaction system containing the styrenic polymer thus produced. As the swelling agent, the solvent for the polymerization reaction may be used as such, but in the purifying treatment, it is preferable to newly add to the treatment system a swelling agent that may be the same as or different from the solvent for the reaction.

In the purifying treatment in which the swelling agent is added to the treatment system simultaneously with the deactivating agent, the treatment time is not specifically limited but preferably satisfies the following relation (Degree of swelling in % by volume/100)×(-treatment time with deactivating agent in mimute)=1 to 30, preferably 5 to 15.

As is seen from the relation, degree of swelling is inversely proportional to treating time with deactivating agent and therefore, the treating time should be increased with a decrease in the degree of swelling.

It is effective in the process of the present invention to carry out when necessary cleaning (filtration) and vacuum drying after the purifying treatment by the above-described procedure. The solvent to be used in cleaning may be the same as or different form the swelling agent. The cleaning temperature may be selected in the range of 0° to 150° C. and not lower than the glass transition temperature of the styrenic polymer, but is preferably determined at a temperature not higher than the boiling point of the cleaning solvent after cooling.

According to the process of the present invention, a highly pure and high-grade styrenic polymer can be obtained without the use of a deashing agent by adding the swelling agent and the deactivating agent to the styrenic polymer produced in the polymerization reaction system in the presence of a polymerization catalyst. Consequently, the process of the present invention is of industrially great value as the process for efficiently producing a highly pure styrenic polymer having a high degree of syndiotactic configuration.

In the following, the present invention will be described in more detail with reference to the nonlimitative examples and comparative examples.

Example 1

By the use of the catalyst consisting of pentamethylcyclopentadienyltitanium trimethoxide (a), N,N-dimethylanilinium tetra(pentafluorophenyl)borate (b) and triisobutylaluminum (c) at a molar ratio, SM (styrene monomer) : c: b: a=350,000:240: 4: 4, SM was polymerized at 70° C. for 2 hours into a polymer (syndiotactic polystyrne) at a conversion efficiency of 70%. A one (1) liter pressure vessel was charged with 100 g of the resultant polymer in an atmosphere of nitrogen and then with 300 ml of ethylbenzene and 300 ml of methanol. The mixture in the vessel was heated to 110° C. with stirring, and maintained thereat for 30 minutes, followed by cooling, filtering and vacuum drying. The polymer thus obtained as the sample was injection molded, and the resultant molding was tested to measure the amount of residual metal components and YI (yellowness index). The results obtained are given in Table 1.

Example 2

A one (1) liter pressure vessel was charged with 100 g of the polymer as obtained in Example 1 in an atmosphere of nitrogen and then with 300 ml of ethylbenzene. The mixture in the vessel was maintained at 80° C. for 15 minutes with stirring, then incorporated with 300 ml of methanol, heated to 110° C. with stirring, and maintained thereat for 30 minutes, followed by cooling, filtering and vacuum drying. The polymer thus obtained as the sample was injection molded, and the resultant molding was tested to measure the amount of residual metal components and YI. The results are given in Tabel 1.

Example 3

The procedure in Example 1 was repeated except that ferrocenium tetra(pentafluorophenyl)borate and ethanol were employed in place of N,N-dimethylanilinium tetra(pentafluorophenyl)borate and methanol, respectively. The results obtained are given in Table 1.

Example 4

The procedure in Example 1 was repeated except that triphenylcarbenium tetra(pentafluorophenyl)borate was employed in place of N,N-dimethyl-anilinium tetra(pentafluorophenyl)borate and the polymerization reaction was carried out for 4.5 hours. The results obtained are given in Table 1.

Example 5

The procedure in Example 1 was repeated except that 480 ml of ethylbenzene and 120 ml of methanol were employed and the treatment temperature was set at 100° C. The results obtained are given in Table 1.

Example 5

The procedure in Example 1 was repeated except that n-propanol was employed in place of methanol. The results obtained are given in Table 1.

Comparative Example 1

The polymer as obtained in Example 1 was vacuum dried as such. The results obtained are given in Table 1.

Comparative Example 2

The procedure in Example 1 was repeated except that 600 ml of ethylbenzene was employed in place of methanol and the treatment temperature was set at 90° C. The results obtained are given in Table 1.

Comparative Example 3

The procedure in Example 1 was repeated except that 600 ml of methanol was employed without the use of ethylbenzene and the treatment temperature was set at 100° C. The results obtained are given in Table 1.

Comparative Example 4

The procedure in Example 4 was repeated except that the treatment temperature was set at 120° C. When the treating liquid was cooled, the whole solution was solidified and thereby the subsequent treatment was made impossible. The results obtained are given in Table 1.

TABLE 1

| | Degree of swelling | Amount of residual metal components (ppm by weight) | | Degree of deashing | |
|---|---|---|---|---|---|
| | (% by voluem) | before treatment | after treatment | (DE value) | YI*2 |
| Example 1 | 25 | 260 | 45 | 0.83 | 14 |
| Example 2 | 25 | 260 | 54 | 0.79 | 15 |
| Example 3 | 25 | 260 | 48 | 0.82 | 15 |
| Example 4 | 25 | 250 | 50 | 0.80 | 15 |
| Example 5 | 22 | 260 | 55 | 0.79 | 16 |
| Example 6 | 26 | 260 | 52 | 0.80 | 16 |
| Comparative Example 1 | — | — | 260 | — | 30 |
| Comparative Example 2 | 27 | 260 | 250 | 0.03 | 28 |
| Comparative Example 3 | −4 | 260 | 255 | 0.02 | 20 |
| Comparative Example 4 | >35 | — | *3 | — | — |

*1Degree of deashing (DE value) obtained by the following formula
DE = 1-(amount of residual metal components in ppm by weight after treatment/amount of residual metal components in ppm by weight before treatment)
*2Yellowness Index: according to JIS K-7103
*3Unmeasurable because part of sample was dissolved and whole solution was solidified.

What is claimed is:

1. A process for purifying a styrenic polymer which comprises treating a styrenic polymer having a high degree of syndiotactic configuration which is produced by the use of a catalyst comprising (A) an aluminoxane or a coordination complex compound comprising a cation and an anion in which a plurality of radicals are bonded to a metal and (B) a transition metal compound, with a swelling agent excluding acid and alkali and a deactivating agent excluding acid and alkali, wherein said swelling agent is added in an amount sufficient to provide a degree of swelling of said styrenic polymer in a range of 5–55%, and wherein said deactivating agent is a solvent having at least one active hydrogen atom in the molecule.

2. The process according to claim 1 wherein the swelling agent and the deactivating agent are simultaneously added to the styrenic polymer to concurrently proceed with swelling and deactivation for the styrenic polymer.

3. The process according to claim 1 wherein the swelling agent has a solubility parameter value (SP value) of 7 to 10 $(cal/cm^3)^{\frac{1}{2}}$.

4. The process according to claim 3 wherein the swelling agent is selected from toluene, xylene, ethylbenzene and cyclohexane.

5. The process according to claim 1 wherein the deactivating agent is a solvent having at least one active hydrogen atom in the molecule.

6. The process according to claim 1 wherein the deactivating agent is an alcohol having 1 to 6 carbon atoms.

7. The process according to claim 1 wherein the treatment with a swelling agent and a deactivating agent is followed by at least one step selected from cleaning, filtration and drying.

8. A process for purifying a styrenic polymer which consisting essentially of treating a styrenic polymer having a high degree of syndiotactic configuration which is produced by the use of a catalyst comprising (A) an aluminoxane or a coordination complex compound comprising a cation and an anion in which a plurality of radicals are bonded to a metal and (B) a transition metal compound, with a swelling agent and a deactivating agent, wherein said swelling agent is added in an amount sufficient to provide a degree of swelling of said styrenic polymer in a range of 5–55% and wherein said deactivating agent is an alcohol having from 1 to 6 carbon atoms.

9. A process for purifying a styrenic polymer which consists essentially of treating a styrenic polymer having a high degree of syndiotactic configuration which is produced by the use of a catalyst comprising (A) an aluminoxane or a coordination complex compound comprising a cation and an anion in which a plurality of radicals are bonded to a metal and (B) a transition metal compound, with a swelling agent excluding acid and alkali and a deactivating agent excluding acid and alkali, wherein said swelling agent is added in an amount sufficient to provide a degree of swelling of said styrenic polymer in a range of 5-55% and wherein said deactivating agent is an alcohol having from 1 to 6 carbon atoms.

* * * * *